W. F. & J. F. HITCHCOCK.
SOUND REPRODUCING MACHINE.
APPLICATION FILED FEB. 24, 1916.
1,295,164.
Patented Feb. 25, 1919.
4 SHEETS—SHEET 1.
Fig. 1
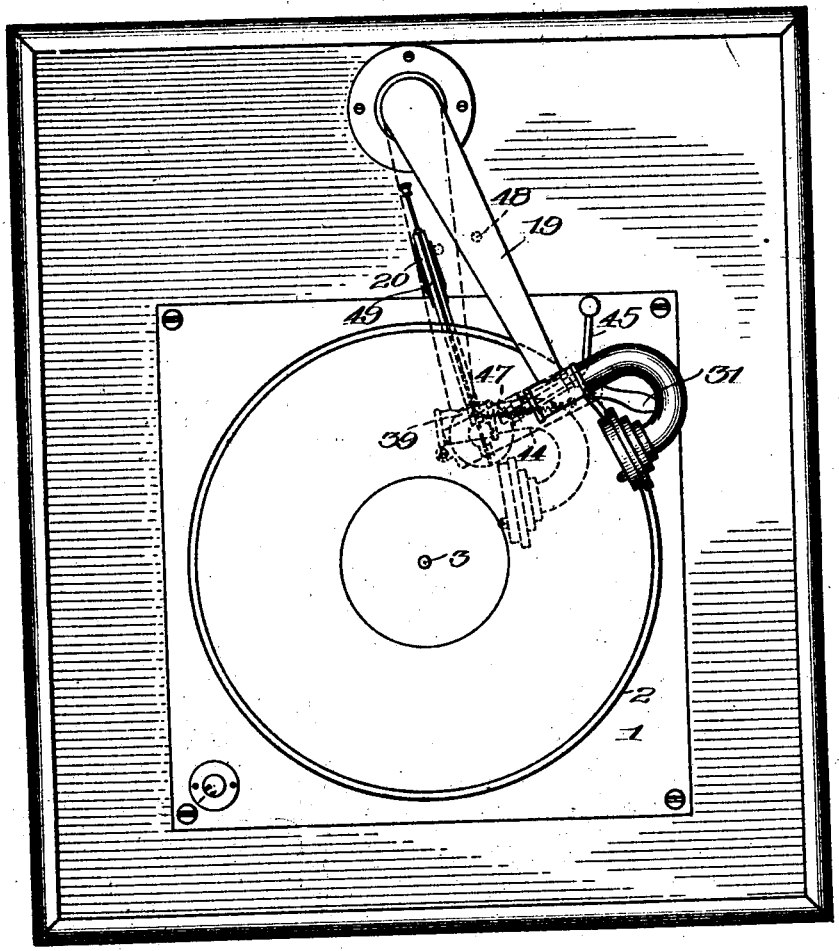
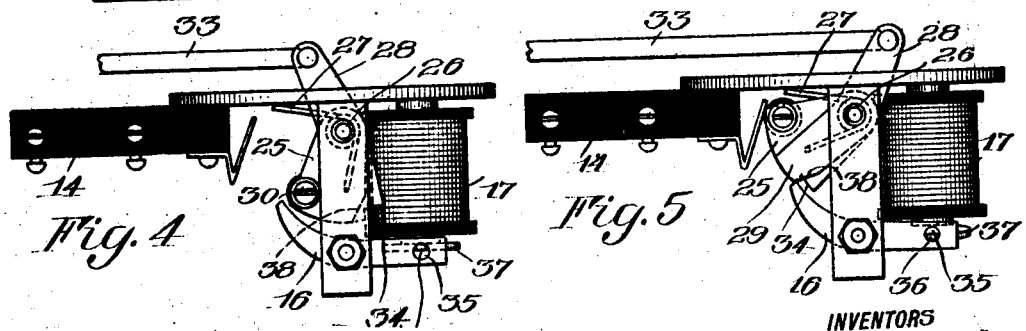
Fig. 4  Fig. 5
WITNESSES:
Nelson H. Copp
H. E. Stonebraker
INVENTORS
William F. Hitchcock
Joseph F. Hitchcock
BY
Church & Church
Their ATTORNEYS

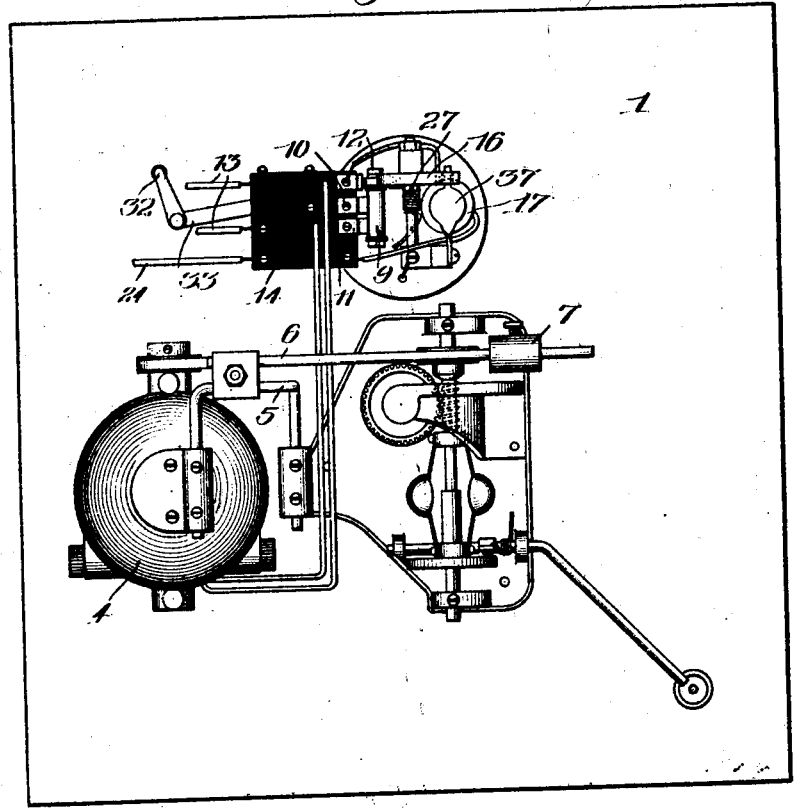
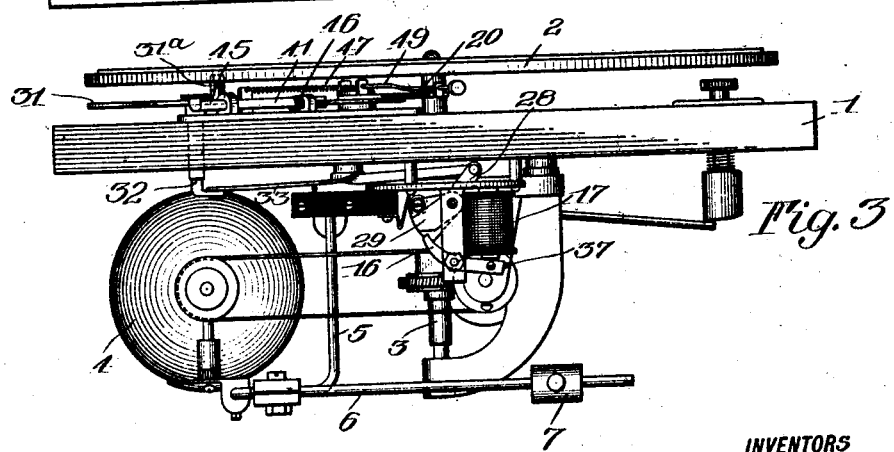

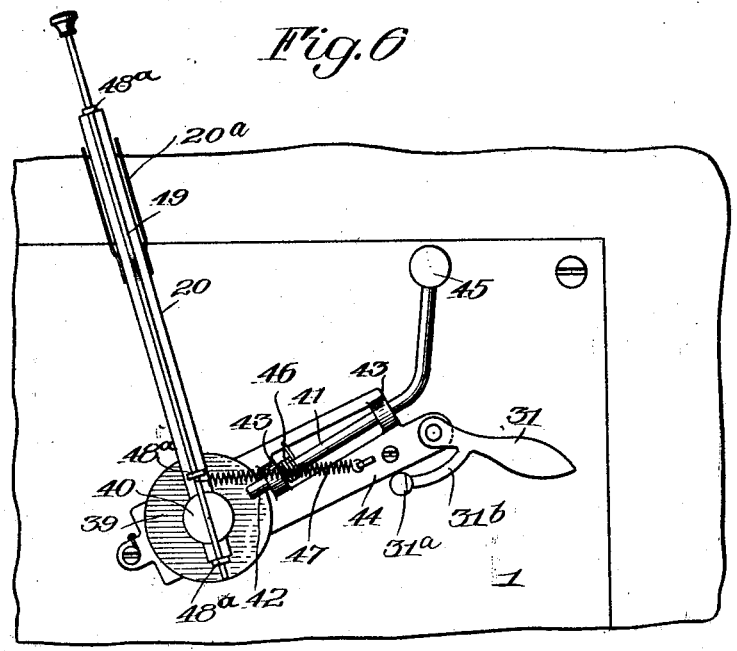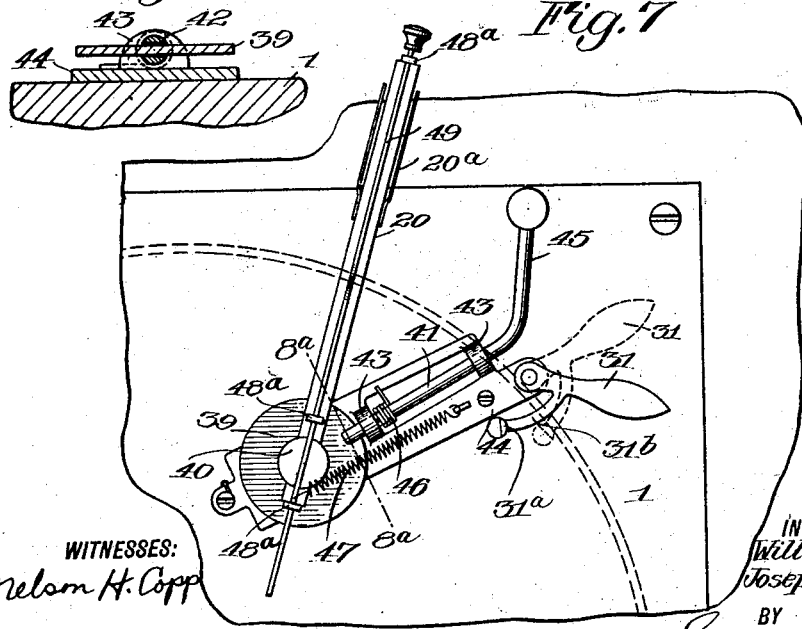

W. F. & J. F. HITCHCOCK.
SOUND REPRODUCING MACHINE.
APPLICATION FILED FEB. 24, 1916.

1,295,164.

Patented Feb. 25, 1919.
4 SHEETS—SHEET 4.

WITNESSES:
Nelson H. Copp
H. E. Stonebraker

INVENTORS
William F. Hitchcock
Joseph F. Hitchcock
BY
Church & Rich
their ATTORNEYS

UNITED STATES PATENT OFFICE.

WILLIAM F. HITCHCOCK AND JOSEPH F. HITCHCOCK, OF ROCHESTER, NEW YORK; SAID JOSEPH F. HITCHCOCK ASSIGNOR TO SAID WILLIAM F. HITCHCOCK.

SOUND-REPRODUCING MACHINE.

1,295,164. Specification of Letters Patent. Patented Feb. 25, 1919.

Application filed February 24, 1916. Serial No. 80,110.

*To all whom it may concern:*

Be it known that we, WILLIAM F. HITCHCOCK and JOSEPH F. HITCHCOCK, of Rochester, in the county of Monroe and State of New York, have invented certain new and useful Improvements in Sound-Reproducing Machines; and we do hereby declare the following to be a full, clear, and exact description, reference being had to the accompanying drawings, forming a part of this specification, and to the reference-numerals marked thereon.

The present invention relates to sound reproducing apparatus with more particular reference to mechanisms which are electrically controlled, that is to say, in which the record carrier or support is driven by an electric motor, and it has for its purpose the provision of simple and efficient mechanism for accurately stopping the motor at any predetermined point during the movement of the record. The invention is especially adapted for machines that employ what are known as disk records and it has for a further purpose to make provision for operating the mechanism successfully either with records in which the reproducer arm travels from the outer edge of the record inwardly or from the inner portion of the record outwardly. Another object of the invention is to so arrange the parts as to simplify the operation and control, and to reduce to a minimum the possibility of the parts getting out of order. To these and other ends the invention consists in certain improvements and combinations of parts, all as will be hereinafter more fully described, the novel features being pointed out in the claims at the end of the specification.

In the drawings:

Figure 1 is a plan view showing the present improvements as applied to an ordinary type of disk record sound reproducing machine;

Fig. 2 is a bottom plan view of the operating mechanism;

Fig. 3 is a side elevation of the same;

Fig. 4 is a detail side elevation of a portion of the stop mechanism, showing the controlling switch open;

Fig. 5 is a similar view with the controlling switch closed, and about to be released by the manual controlling mechanism;

Fig. 6 is a plan view of the adjustable contact and its controlling parts;

Fig. 7 is a similar view, with the spring which controls the adjustable contact reversed, so as to effect movement of the contact in the opposite direction;

Fig. 8 is a detail sectional view on the lin 8ª—8ª of Fig. 7;

Similar reference numerals throughout the several views indicate the same parts.

Figure 9:
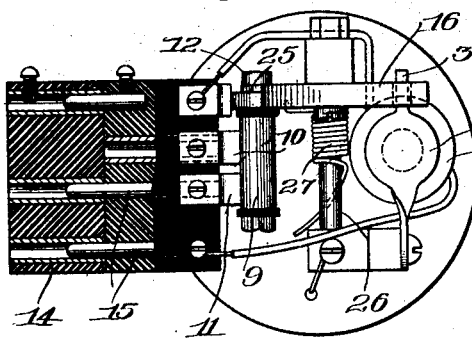
Fig. 9 is a bottom plan view of the movable switch and its controlling magnet appearing with parts in section.

In the present embodiment the invention is illustrated in its application to a usual type of disk record apparatus, including a panel or base 1 and a record table or support 2 carried by the rotary member or shaft 3, which latter is driven through suitable gearing from an electric motor 4. The motor 4 is supported upon a resilient arm 5 and carries a rod 6 upon which is arranged a weight 7 for longitudinal adjustment, and which acts to muffle or counter-act the vibration of the motor, all as pointed out in pending application, Serial No. 874,225, filed November 27, 1914.

Figure 11:
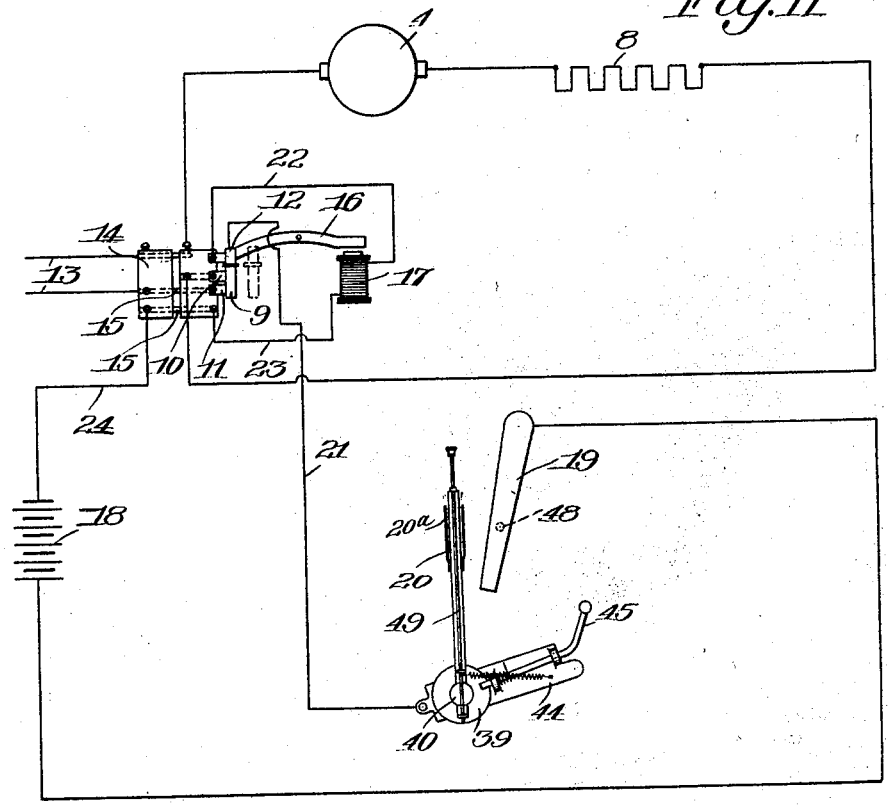
Fig. 11 is a diagrammatic view illustrating the arrangement of electrical circuits.

The motor 4 is included in a circuit shown in Fig. 11 and which also embraces a resistance coil 8 and is closed through a movable switch that includes a portion 9, coöperating with the motor circuit through contacts 10 and 11, and a portion 12 that is insulated from the aforementioned portion 9. 13 indicates the main conductors which furnish current to the motor, and are connected to conducting sleeves of a removable block 14 adapted to be secured in operative relation with conducting plugs 15 in the manner shown in Fig. 9. Referring to Fig. 11, the movable switch is controlled by a locking member 16, the position of which is governed by an electromagnet 17, that derives current from battery 18, passing through the movable reproducer arm 19 into the adjustable contact 20, when the reproducer arm reaches the limit of its movement, thence through conductor 21, to the movable switch, thence through conductor 22 to the magnet, and from there through conductors 23 and 24 back to the battery. After the adjustable contact is set to the desired position, the instrument is operated by actuating the movable switch which immediately closes the motor circuit, the switch being held in such closed position by locking member 16 until the electromagnet circuit is closed, which occurs at the time that the reproducer arm reaches the end of a record, whereupon the locking member is tripped and the movable switch is released. This will afford an idea of the general operation of the mechanism and we will now describe more particularly the details of parts by which this is accomplished.

Figure 10:
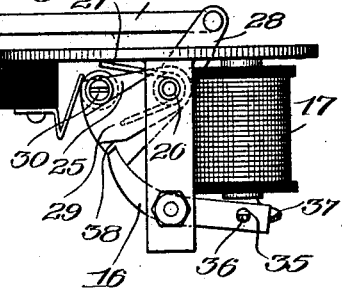
Fig. 10 is a side elevation showing the position of the parts with the switch closed.

The movable switch is designated generally in Figs. 4, 5 and 10 by 25, and is mounted on a bearing 26, and held normally in the position shown in Fig. 4, so as to open the circuit by means of a spring 27. Also pivotally mounted on the bearing 26 is a lever 28, the extremity 29 of which engages projection 30 on the switch for moving the same to the position shown in Figs. 5 and 10. The lever 28 is operated by a handle 31 which is mounted on a spindle 32 from which a connecting rod 33 leads to the lever 28. The movable switch is held in position to close the motor circuit by means of a locking member 16, which is in the form of a pivoted gravity-actuated latch, as shown in Figs. 4, 5 and 10, coöperating with a notch or recess 34 on the switch to hold the latter elevated as shown in Fig. 10. The locking member is provided with an opening 35 which receives a projection 36 carried by the armature 37 that is controlled by the electromagnet 17. The projection 36 is somewhat smaller in cross section than the diameter of opening 35 so that it has a certain amount of play in the opening, the effect of which is to permit the projection or the armature when the latter is engaged, to strike the locking member with somewhat of a blow, so that but very little power is required to move the locking member far enough to release the switch, which is thereupon immediately returned to normal position, opening the motor circuit. In some instances it may be desirable to stop the operation of the motor manually, and before the record is completed, and this may be done by operating the handle 31 already referred to, which causes movement of the lever 28, bringing the beveled edge 38 of the lever against the locking member and moving the latter out of engagement with the notch 34 as shown clearly in Fig. 5. The electromagnet circuit is closed, to effect opening of the motor circuit, when the reproducer arm reaches the limit of its movement, by its coming into engagement with the adjustable contact 20, and we will now describe more particularly the particular construction and arrangement of the latter.

The arm 20 is mounted on a circular plate or support 39 which is rotatable on a post 40, and is held in any position of adjustment by means of a friction lock preferably consisting of a spring actuated rod 41, having a bifurcated end portion 42 engaging on opposite sides of the plate 39 as shown in Fig. 8. The rod 41 is mounted in bearings 43 formed on a base plate 44, which may be attached to the panel or base 1. The rod 41 carries a handle portion 45 by which it may be turned against the action of the spring 46, so as to release the plate 39 which is moved by a spring 47. In the operation of this portion of the mechanism, the reproducer arm is set at the desired point on the record where the motor is to be stopped, and the handle 45 is then turned slightly, releasing the adjustable contact 20, which moves under the influence of the spring 47 until it engages a stop 48 on the reproducer arm. The handle 45 is then released and the friction lock retains the adjustable contact in the position to which it has been set and the reproducer arm is then moved to the initial point of the record and the motor is started by closing the circuit as already described.

Owing to the fact that there are some disk records which are played from the outer edge of the record inwardly while others are played from the central portion toward the periphery, movement of the reproducer arm in the two cases is in opposite directions and it therefore becomes necessary, in order to accommodate both styles of records to provide for actuating the adjustable contact 20 in opposite directions and this is accomplished in the following manner: The arm 20 carries a series of lugs 48ᵃ having openings therein forming guides for the rod 49. The spring 47 already mentioned is connected at one end to the base 44 and at its opposite end to the rod 49 and by adjusting the latter longitudinally of the arm 20 the spring 47 may be moved to opposite sides of the rotary axis of the contact arm as shown in Figs. 6 and 7. The rod 49 is held in either adjusted position by its frictional engagement with the lugs 48 and by moving it to either one of the positions mentioned, it is possible instantly to operate the mechanism in conjunction with either of the well known styles of disk records.

The arm 20 also preferably carries yieldable portions which contact with the reproducer arm, and are in the form of flexible members 20ᵃ, of wire or spring steel, each having one end secured to the arm 20, and its other end free and spaced from the arm. When the contact arm 20 is set, it moves into engagement with the reproducer arm, producing a slight pressure against and flexing one or the other of flexible members 20ᵃ, according to the direction of adjustment of the arm 20ᵃ, and when the reproducer arm is moved away to start the operation, the flexible member resumes its normal or unflexed position, for engagement with the reproducer arm at the proper point in its travel. If there is not a yielding relation between the contact arm 20 and the reproducer arm, there is a tendency for the contact arm to move away from proper position of adjustment, owing to the natural spring of the parts, there being no means for positively retaining it in adjusted position. Further, the yieldable members allow for properly stopping movement of a record where the adjustment is made with respect to a concentric groove, such as found in many records spaced slightly in a radial direction from the reproducing groove, and insure stopping the operation promptly when the end of the reproducing groove is reached.

In order to positively stop movement of the record, I may employ a brake, which is automatically controlled, and comprises a shoe 31ᵃ carried on an arm 31ᵇ, which latter is supported on the handle 31. The shoe 31ᵃ engages the edge of the record table or support, as shown in dotted lines in Fig. 7, and is brought into such braking relation automatically when the controlling magnet is operated, as already described, to return handle 31 to its normal position.

The structure herein described is especially adapted for the purposes of the invention, by reason of its simplicity and sensitiveness of operation, which are essentials that enter into the practicability of any mechanism of this general character, and while we believe the form of our improvement to be new, the invention is not limited to the precise details set forth, since other forms or modifications may be adopted without departing from the essential characteristics of the improvement.

We claim as our invention:

1. In a sound reproducing machine, the combination with a rotary member, of a movable arm, an electric circuit, a motor included in said circuit and operatively connected to the rotary member, a manually controlled pivotally mounted switch arranged in said circuit and spring actuated to open position, a gravity controlled locking member acting to hold said switch closed and having an opening therein, a second circuit controlled by said movable arm, an electromagnet in the second circuit, and an armature governed by said electromagnet and provided with a projection which extends into and is freely movable within said opening.

2. In a sound reproducing machine, the combination of a rotary member, a motor operatively connected therewith, an electric circuit including the motor, a switch in said circuit, means for automatically opening said switch, a device for normally retaining the switch closed, an arm movable in contact with said rotary member and means controlled by the movement of said arm for actuating said device to permit the opening of said switch.

3. In a sound reproducing machine, the combination of a rotary member, a motor operatively connected therewith, an electric circuit including the motor, a switch in said circuit, means for automatically opening said switch, a device for normally retaining the switch closed, an arm movable in contact with said rotary member, a brake for said rotary member controlled by said switch, and means controlled by the movement of said arm for actuating said device to permit the opening of said switch and engage the brake with the rotary member.

4. In a sound reproducing machine, the combination of a rotary member, means for rotating the same, an arm coöperating with said rotary member and movable in reverse directions, means controlled by an electric circuit for stopping said rotary member, an adjustable contact in said circuit and a coöperating contact on the arm adapted to close the circuit and stop the rotary member as the arm moves in one direction or another.

WILLIAM F. HITCHCOCK.
JOSEPH F. HITCHCOCK.

Witnesses:
H. E. STONEBRAKER,
RUSSELL B. GRIFFITH.

Copies of this patent may be obtained for five cents each, by addressing the "Commissioner of Patents, Washington, D. C."